Jan. 7, 1958   J. W. LYNCH ET AL   2,818,792
WEEDING DEVICE
Filed March 16, 1955   3 Sheets-Sheet 2
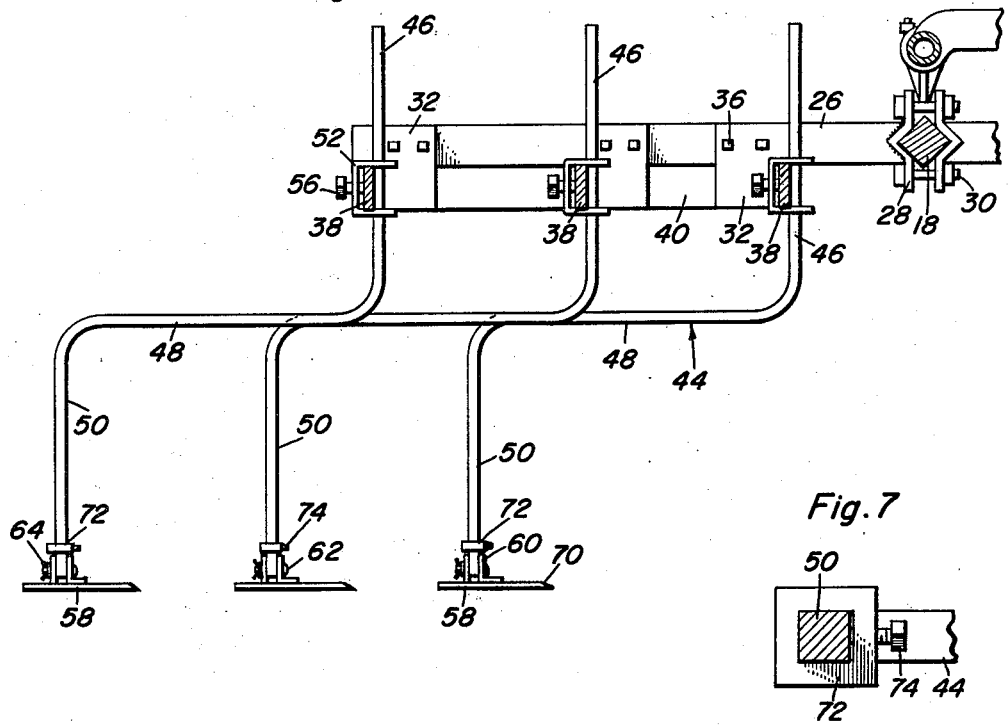
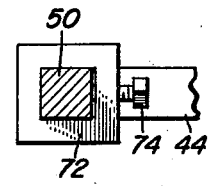
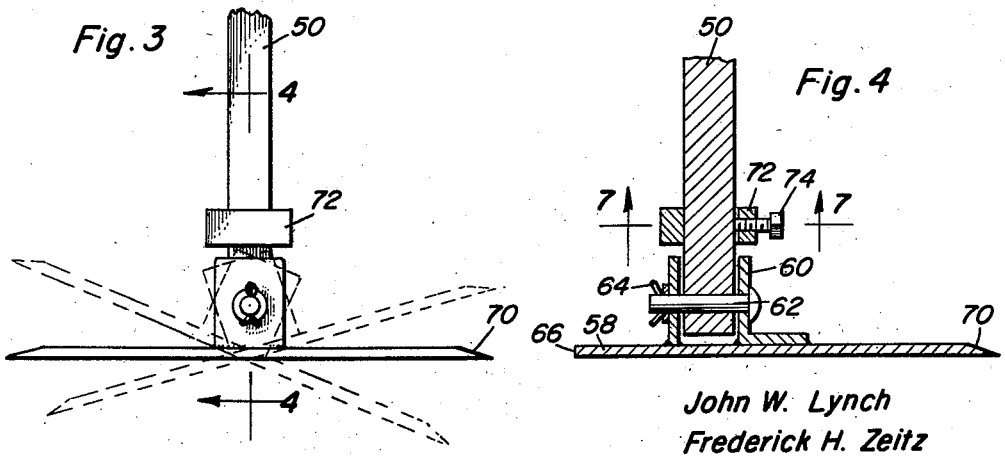
John W. Lynch
Frederick H. Zeitz
INVENTORS Jan. 7, 1958   J. W. LYNCH ET AL   2,818,792
WEEDING DEVICE Filed March 16, 1955   3 Sheets-Sheet 3

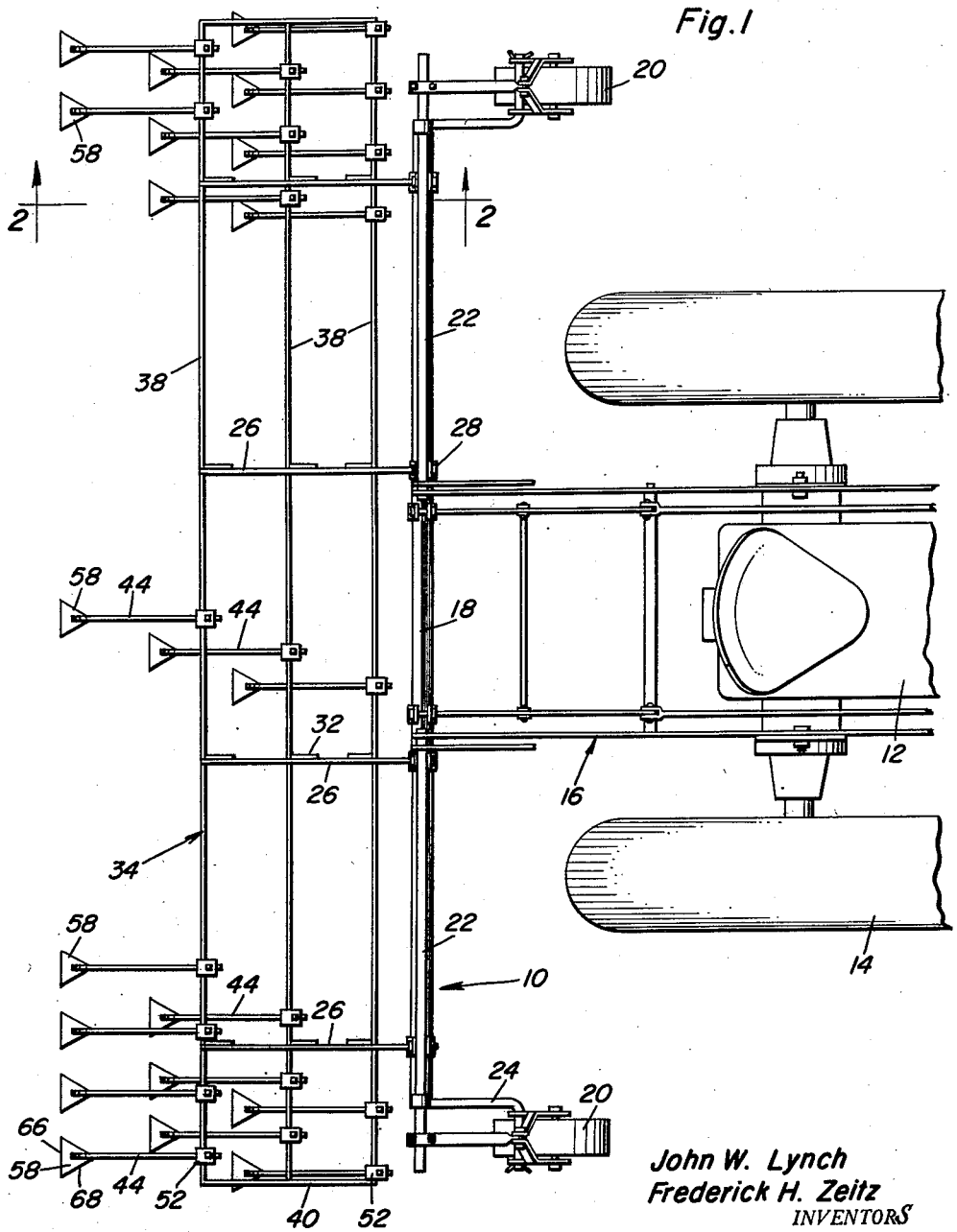

John W. Lynch
Frederick H. Zeitz
INVENTORS

BY *Clarence A. O'Brien*
*and Harvey B. Jacobson*
Attorneys

United States Patent Office 2,818,792
Patented Jan. 7, 1958

2,818,792

WEEDING DEVICE

John W. Lynch and Frederick H. Zeitz, Lubbock, Tex.

Application March 16, 1955, Serial No. 494,612

8 Claims. (Cl. 97—144.1)

This invention generally relates to a weeding device for use in conjunction with a standard tractor for the preparation of land for planting or after planting in the weeding and cleaning of crops.

An object of the present invention is to provide a weeding device that will effectively mulch and weed the surface of the ground and at the same time, conserve moisture by not turning the soil and exposing it to the sun and wind which causes the soil to dry out.

Another object of the present invention is to provide a weeding device in conformance with the preceding object which includes in its construction a plurality of flat plates mounted with the flat surfaces generally parallel to the ground surface for effectively weeding such ground surface wherein the blades cut shallow under the ground surface, thereby conserving moisture but effectively weeding the soil.

Another important feature of the present invention is the provision of a weeding device conformable to the preceding objects in which a plurality of plates are mounted on individual and independently adjustable tines so that the plates may be adjusted to follow the contour of the earth's surface which is especially useful in plowing contoured or terraced fields.

Other important objects of the present invention will reside in its simplicity of construction, efficiency of operation, ease of adjustment, adaptation for its purpose and its relatively inexpensive manufacturing costs and maintenance costs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the weeding device of the present invention attached to the rear portion of a tractor;

Figure 2 is a transverse vertical sectional view taken substantially upon a plane passing along section line 2—2 of Figure 1 showing the construction of certain elements of the weeding device;

Figure 3 is an enlarged rear elevational view of one of the cultivating plates and the manner in which it pivots about its mounting axis;

Figure 4 is a vertical, sectional view taken substantially upon a plane passing along section line 4—4 of Figure 3 showing the construction of the adjustable collar together with the construction of the pivot pin mounting the blades;

Figure 7 is a plan view taken substantially upon a plane passing along section line 7—7 of Figure 4 showing the shape of the tines as well as the shape of the collar slidably positioned thereon;

Figure 8 is a rear elevational view showing the tines and their associated plates mounted in adjusted position fitting the contour of the surface, such as hilled row crops and the like.

Figure 5:
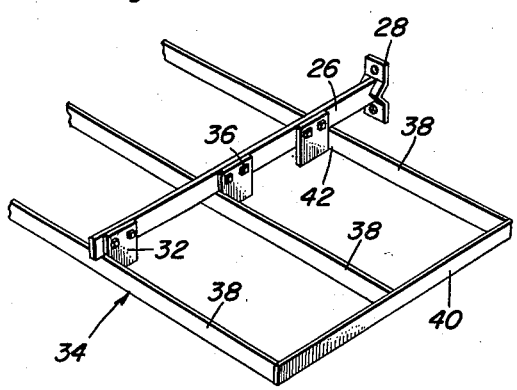
Figure 5 is a perspective view of one end of the supporting frame that is mounted in depending relation from the supporting bars extending rearwardly from the tool bar.
Figure 6:
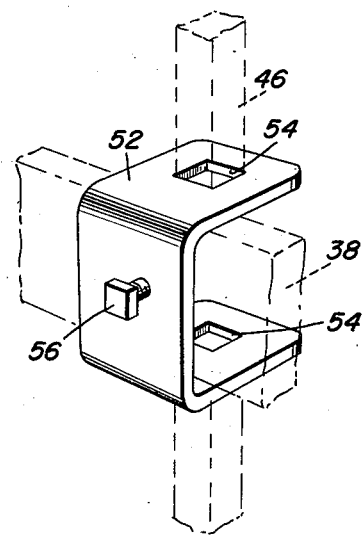
Figure 6 is a perspective view showing the details of the clamps for securing the tines in vertically and horizontally adjusted position on the mounting members forming the frame.

Referring now specifically to the drawings, it will be seen that the numeral 10 generally designates the weeding device of the present invention which is adapted to be attached to a tractor 12 having ground engaging driving wheels 14 at the rear thereof together with a conventional hitch 16 at the rear thereof for supporting and adjusting a transverse polygonal tool bar 18. A ground engaging wheel 20 is disposed at each end of the tool bar 18 and is mounted on a supporting shaft 22 by an offset member 24 whereby the shaft 22 may be rotated about its longitudinal axis for raising and lowering the ground engaging wheels 20, thereby generally controlling the vertical position of the tool bar 18 which is conventionally used in conjunction with farm implements of various types.

Secured to and extending rearwardly from the tool bar 18 is a plurality of generally horizontal and parallel spaced support bars 26 that are attached to the tool bar 18 by clamp members 28 and clamp bolts 30 which rigidly secure the support bars 26 on the tool bar 18 in spaced relation.

The support bars 26 are provided with longitudinally spaced brackets 32 for suspending a frame generally designated by the numeral 34 therefrom by the use of suitable fastening means 36.

The frame 34 is generally horizontally disposed and includes a plurality of transversely extending parallel spaced mounting members or bars 38 interconnected at their ends by end members 40 thereby forming a rigid frame 34 that is rigidly secured to the support bars 26 by welding the lower ends of the brackets 32 to the mounting members 38, as designated by the numeral 42.

Secured to each of the mounting members 38 is a plurality of tines generally designated by the numeral 44 and being generally Z-shaped with the vertical portion 46 and a horizontal portion 48 formed with the bottom thereof and a second vertical portion 50 offset from the first vertical portion 46 and disposed therebelow. The vertical portion 46 intersects the mounting member 38 to which it is attached and is secured thereto by a generally U-shaped member 52 having aligned polygonal apertures 54 in the leg portion thereof for slidably receiving the polygonal vertical portion 46. The bight portion of the U-shaped clamp member 52 is provided with a setscrew 56 screw threaded therethrough for engaging the flat surface of the mounting member 38 thereby rigidly securing the tine 44 in vertically adjusted position in relation to the mounting members 38 and in relation to the tool bar 18.

Referring now specifically to Figures 3 and 4 of the drawings, it will be seen that the lower portion 50 of each of the tines 44 is provided with a cultivating plate or blade 58 of generally triangular configuration that includes forward and rear upstanding lugs 60 positioned forwardly and rearwardly of the lower end of the lower portion 50 of the tines 44 whereby a fastening member 62 extends through the lugs 60 and the lower end of the tine 44 and is secured thereto by suitable cotter pin 64, thereby pivotally securing the plate 58 to the tine 44 for free movement about a horizontal axis formed by the fastening pin 62 which is parallel to the path of movement of the tines 44. The plates 58 are generally triangular in configuration, with the base 66 thereof being disposed rearwardly and the converging edges 68 being disposed forwardly, and the converging edges 68 are beveled at the upper corner thereof, as designated by the numeral 70 thereby forming a completely flat bottom surface that is sharpened at its forward converging edges 68. In order to limit the pivotal movement of the plate 58, a collar 72 of generally polygonal construction is slidably positioned over the lower portion 50 of the tines 44 and a setscrew 74 is positioned through one side of the collar 72 for locking the collar 72 in adjusted position. It will be seen that the lugs 60 are provided with flat upper surfaces so that the collar 72 may be lowered into abutting engagement with the upper edges of the lugs 60, thereby substantially preventing pivotal movement of the plates 58. By spacing the collar 72 a desired amount away from the upper ends of the lugs 60, the degree of pivotal movement of the plates 58 may be determined.

Figure 8:
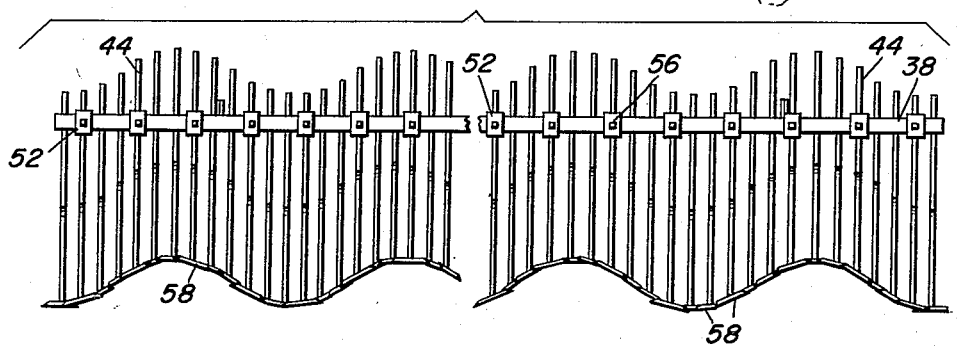
Figure 9:
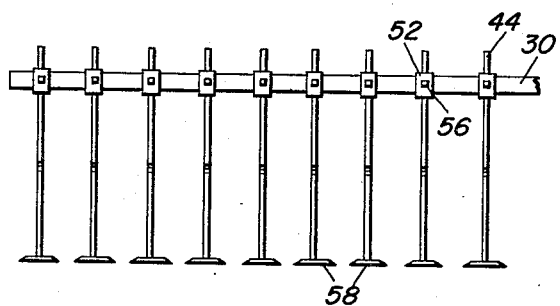
Figure 9 is a partial rear elevational view of the weeding device of the present invention when all of the plates are substantially in a single horizontal plane.

For purposes of clarity, portions of the tines 44 and the plates 58 have been omitted from Figure 1, although it will be understood that the tines are disposed completely across the frame 34, substantially as illustrated in Figure 8. By adjusting the position of the tines 44, the position of the plates 58 may be adjusted thereby positioning the plates 58 to follow or generally outline the curvature or contour of contoured or terraced soil, as specifically shown in Figure 8 wherein the plates are shown in their cultivating position. The plates 58 will cultivate the soil before planting or cultivate the crops after planting without exposing the soil to the sun and drying wind. By adjusting the tines 44, crops planted on the ridge, in the furrow or flat may be cultivated with equal efficiency. The stop collar 72 may be utilized for limiting the free pivotal movement of the plate members 58 or may be used to position the plates 58 in rigid position. Since a portion of the tines may be removed, the device may be easily adapted for plowing row crops after the crops have been planted and it is desirable not to disturb the plants. The free pivotal movement of the plates 58 and the triangular shape thereof cooperate to retain the plates 58 in generally parallel relation to the surface of the soil being cultivated. The camming action of the diverging edges of the plates is equalized by engagement of the soil with the edges. For instance, if the plate is tilted in one direction by a rock or the like, the resistance to movement of the depressed edge by the soil will cam the depressed edge upwardly for paralleling the plate with the surface of the soil.

Since the plates 58 are disposed with only their forward edges 68 cutting into the soil, it will be readily seen that the weeding device 10 may be pulled with a tractor with much less power expended, thereby permitting a smaller tractor to be used and also permitting the use of other cultivating equipment simultaneously with the weeding device of the present invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claims.

What is claimed as new is as follows:

1. A weeding device for attachment to a tractor comprising a transversely elongated tool bar adapted to be attached to a tractor, a plurality of rearwardly extending support bars attached to said tool bar, a transverse frame suspended from said support bars, a plurality of tines attached to said frame, and a blade mounted on the lower end of each tine, said blades being flat and disposed generally with the flat surfaces parallel to the ground surface for weeding such surface, said blades being pivotally secured to the lower end of the tines for pivotal movement about a generally horizontal axis parallel to the path of movement of said tines, and means for selectively limiting the pivotal movement of said blades, said means for limiting the pivotal movement including a pair of pivot lugs on each of said blades receiving the lower end of the tine, a longitudinally disposed pivot pin connecting the lugs to the tine, said lugs having a flat upper end, a collar slidably mounted on the lower end of each tine for engagement with the upper ends of said lugs, and a setscrew for securing the collar in position whereby the point of contact between the collar and lugs may be varied thereby varying the pivotal movement of said blades.

2. A weeding device for attachment to a tractor comprising a transversely elongated tool bar adapted to be attached to a tractor, a plurality of rearwardly extending support bars attached to said tool bar, a transverse frame suspended from said support bars, a plurality of tines attached to said frame, and a blade mounted on the lower end of each tine, said blades being flat and disposed generally with the flat surfaces parallel to the ground surface for weeding such surface, said blades being pivotally secured to the lower end of the tines for pivotal movement about a generally horizontal axis parallel to the path of movement of said tines, and means for selectively limiting the pivotal movement of said blades, said means for limiting the pivotal movement including a pair of pivot lugs on each of said blades receiving the lower end of the tine, a longitudinally disposed pivot pin connecting the lugs to the tine, said lugs having a flat upper end, a collar slidably mounted on the lower end of each tine for engagement with the upper ends of said lugs, and a setscrew for securing the collar in position whereby the point of contact between the collar and lugs may be varied thereby varying the pivotal movement of said blades, said frame including a plurality of horizontally disposed spaced parallel mounting members, said tines being vertically adjustably secured to said mounting members in a plurality of transverse rows.

3. The combination of claim 2 wherein each of said tines is Z-shaped with offset vertical portions connected by a central horizontal portion, the upper vertical portion being adjustably connected to one of said mounting members and the lower of said vertical portions having the blade attached thereto for supporting the blades rearwardly of the connection between the blade supporting tine and the mounting member.

4. The combination of claim 2 wherein said tines are independently adjustable thereby permitting the blades to be disposed to conform to the contour of the ground surface for weeding terraced soil.

5. A weeding device for attachment to a tractor comprising a transversely elongated tool bar adapted to be attached to a tractor, a plurality of rearwardly extending support bars attached to said tool bar, a transverse frame suspended from said support bars, a plurality of tines attached to said frame, and a blade mounted on the lower end of each tine, said blades being flat and disposed generally with the flat surfaces parallel to the ground surface for weeding such surface, said blades being pivotally secured to the lower end of the tines for pivotal movement about a generally horizontal axis parallel to the path of movement of said tines, and means for selectively limiting the pivotal movement of said blades, said means for limiting the pivotal movement including a pair of pivot lugs on each of said blades receiving the lower end of the tine, a longitudinally disposed pivot pin connecting the lugs to the tine, said lugs having a flat upper end, a collar slidably mounted on the lower end of each tine for engagement with the upper ends of said lugs, and a setscrew for securing the collar in position whereby the point of contact between the collar and lugs may be varied thereby varying the pivotal movement of said blades, said frame including a plurality of horizontally disposed spaced parallel mounting members, said tines being vertically adjustably secured to said mounting members in a plurality of transverse rows, each of said blades being generally triangular with the base thereof being disposed towards the rear of said frame and the converging edges facing forwardly of said frame, said converging edges being sharpened for weeding the ground.

6. The combination of claim 5 wherein each of said tines is Z-shaped with offset vertical portions connected by a central horizontal portion, the upper vertical portion being adjustably connected to one of said mounting members and the lower of said vertical portions having the blade attached thereto for supporting the blades rearwardly of the connection between the blade supporting tine and the mounting member.

7. The combination of claim 6 wherein said tines are independently adjustable thereby permitting the blades to be disposed to conform to the contour of the ground surface for weeding terraced soil.

8. A cultivating and weeding device comprising a mobile frame, a plurality of tines vertically adjustably mounted on said frame, and a plurality of flat plates disposed in a generally horizontal plane, said plates being mounted on the lower end of said tines for limited free pivotal movement about a generally longitudinal axis whereby the plates may be adjusted to generally define the contour of the soil being cultivated with the plates being freely pivotal for generally paralleling the soil surface in spaced relation below the same when the soil is being cultivated, said pivotal connection between the tines and plates being disposed adjacent the center of the top surface of the plates.

References Cited in the file of this patent

UNITED STATES PATENTS

| | | |
|---|---|---|
| 340,621 | Roberts | Apr. 27, 1886 |
| 585,962 | Mavis | July 6, 1897 |
| 635,617 | Tucker | Oct. 24, 1899 |
| 788,531 | Herron | May 2, 1905 |
| 806,707 | Pellegrin et al. | Dec. 5, 1905 |
| 1,122,899 | Funk | Dec. 29, 1914 |
| 1,561,466 | Healy | Nov. 17, 1925 |
| 1,694,252 | Doepke | Dec. 4, 1928 |
| 2,562,486 | Denning | July 31, 1951 |
| 2,649,722 | Raught | Aug. 25, 1953 |

FOREIGN PATENTS

| | | |
|---|---|---|
| 403,746 | Germany | Oct. 3, 1924 |